(12) United States Patent
Schweitzer et al.

(10) Patent No.: US 8,168,709 B2
(45) Date of Patent: *May 1, 2012

(54) METHOD OF PROCESSING RUBBER COMPOSITION, RUBBER COMPOSITION AND PNEUMATIC TIRE

(75) Inventors: Claude Schweitzer, Colmar-Berg (LU); Lars Gebert, Naurath (DE); Fahri Ozel, Eischen (LU); Lothar Braun, Bollendorf (DE); Uwe Ernest Frank, Konz (DE); Annette Lechtenboehmer, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 163 days.

This patent is subject to a terminal disclaimer.

(21) Appl. No.: 12/535,762

(22) Filed: Aug. 5, 2009

(65) Prior Publication Data
US 2011/0034619 A1 Feb. 10, 2011

(51) Int. Cl.
*B29B 17/00* (2006.01)
(52) U.S. Cl. .......................... 524/318; 524/381; 524/514
(58) Field of Classification Search .................. 524/506, 524/318, 381, 514
See application file for complete search history.

(56) References Cited

U.S. PATENT DOCUMENTS

| 2006/0036034 A1* | 2/2006 | Chaves et al. ................. 525/100 |
| 2009/0151840 A1* | 6/2009 | Lechtenboehmer et al. . 152/458 |
| 2010/0154948 A1* | 6/2010 | Dahlberg et al. .......... 152/209.4 |

FOREIGN PATENT DOCUMENTS

| EP | 0 329 589 A2 | 8/1989 |
| EP | 2 072 283 A1 | 6/2009 |
| WO | 2009/060067 A1 | 5/2009 |
| WO | WO2009/060067 A1 | 5/2009 |

OTHER PUBLICATIONS

Pages—Cover Story, cont'd 49-51, "Sulfron®: The revolutionary modified aramid from Teijin Twaron," *Rubber Asia*, published Jul./Aug. 2007.
European Search Report Completed Nov. 26, 2010.

* cited by examiner

*Primary Examiner* — Peter D Mulcahy
(74) *Attorney, Agent, or Firm* — John D. DeLong

(57) ABSTRACT

The present invention is directed to a method of processing a rubber composition, comprising the steps of
  mixing at least one diene base elastomer with at least one additive selected from the group consisting of fillers, to a final temperature of about 150 to about 160° C. in a first non-productive mix step to form a first non-productive mix;
  cooling the first non-productive mix to a temperature of about 60 to about 90° C.;
  mixing the first non-productive mix with 0.1 to 10 parts by weight, per 100 parts by weight of elastomer, of a treated short aramid fiber having a length ranging from 1 to 10 mm and having a thickness ranging from 5 to 15 microns and comprising 3 to 40 percent by weight of a peroxide radical initiator in a second non-productive mix step to a final temperature of about 150 to about 160° C. to form a second non-productive mix; and
  mixing the second non-productive mix with curatives in a productive mix step to form a productive mix.

11 Claims, 3 Drawing Sheets

METHOD OF PROCESSING RUBBER COMPOSITION, RUBBER COMPOSITION AND PNEUMATIC TIRE

FIELD OF THE INVENTION

The present invention relates to a method of processing a rubber composition, and to rubber compositions and pneumatic tires made therefrom.

BACKGROUND OF THE INVENTION

Short fibers have been included in rubber compositions to improve reinforcement. Typically however the level of interaction of the fibers with the surrounding rubber is inadequate, resulting in less than desirable performance. There is a need therefore for improved processing of such rubber compositions to provide better performance of the composition.

SUMMARY OF THE INVENTION

The present invention is directed to a method of processing a rubber composition, comprising the steps of
mixing at least one diene base elastomer with at least one additive selected from the group consisting of fillers, to a final temperature of about 150 to about 160° C. in a first non-productive mix step to form a first non-productive mix;
cooling the first non-productive mix to a temperature of about 60 to about 90° C.;
mixing the first non-productive mix with 0.1 to 10 parts by weight, per 100 parts by weight of elastomer, of a treated short aramid fiber having a length ranging from 1 to 10 mm and having a thickness ranging from 5 to 15 microns and comprising 3 to 40 percent by weight of a peroxide radical initiator in a second non-productive mix step to a final temperature of about 150 to about 160° C. to form a second non-productive mix; and
mixing the second non-productive mix with curatives in a productive mix step to form a productive mix.

The present invention is further directed to a rubber composition made by the disclosed method.

The present invention is further directed to a pneumatic tire comprising the rubber composition made by the disclosed method.

DETAILED DESCRIPTION OF THE INVENTION

Figure 1:
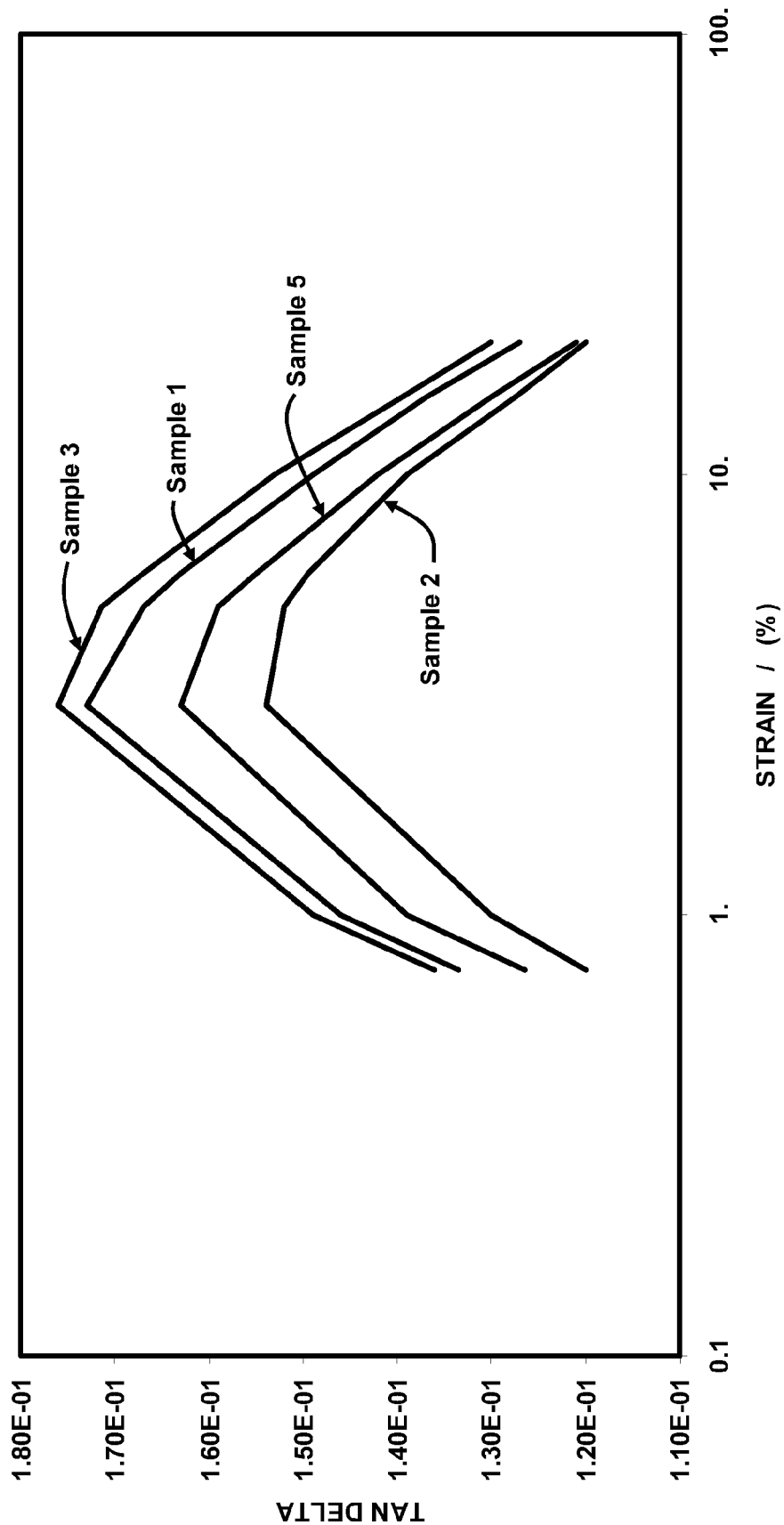
FIG. 1 shows a plot of tan delta versus strain for several rubber compositions.

There is disclosed a method of processing a rubber composition, comprising the steps of
mixing at least one diene base elastomer with at least one additive selected from the group consisting of fillers, to a final temperature of about 150 to about 160° C. in a first non-productive mix step to form a first non-productive mix;
cooling the first non-productive mix to a temperature of about 60 to about 90° C.;
mixing the first non-productive mix with 1 to 10 parts by weight, per 100 parts by weight of elastomer, of a treated short aramid fiber having a length ranging from 1 to 10 mm and having a thickness ranging from 5 to 15 microns and comprising 3 to 40 percent by weight of a peroxide radical initiator in a second non-productive mix step to a final temperature of about 150 to about 160° C. to form a second non-productive mix; and
mixing the second non-productive mix with curatives in a productive mix step to form a productive mix.

There is further disclosed a rubber composition made by the foregoing method, and to a pneumatic tire comprising the rubber composition.

The rubber composition includes from 0.1 to 10 phr of a treated short aramid fiber. In another embodiment, the rubber composition includes from 1 to 5 phr of treated short aramid fiber.

In one embodiment, the treated fiber is made as described in WO2009/060067. As disclosed therein, the treated fiber may be made for example as in Example 1 at page 10 lines 19 to 24, wherein a poly(para-phenylene-terephthalamide)fiber is treated with peroxide in acetone solution. To a poly(para-phenylene-terephthalamide)fiber powder a solution of peroxide in acetone is added. The amount of acetone equals twice the summed amounts of aramid and peroxide. The solution is completely absorbed by the powder. The solvent is allowed to evaporate until the powder reaches constant weight.

In one embodiment, the treated short aramid fiber has a length ranging from 0.5 to 20 mm.

In one embodiment, the treated short aramid fiber has a thickness ranging from 2 to 30 microns.

In one embodiment, the treated short aramid fiber comprises a peroxide radical initiator wherein the particle contains 3-40 wt % peroxide radical initiator based on the weight of the aramid. In one embodiment, the particle contains 6 to 30 wt % peroxide. The peroxide can be any compound which contains at least one peroxide group. Suitable peroxides include organic mono- or bisperoxides. Peroxides can be technically pure or mixed with an inorganic support such as clay or silica, a polymeric support such as EPDM or combinations of these supports.

In one embodiment, the peroxides can be diluted with a solvent or oil such as paraffin oil.

In one embodiment, the peroxides can be dispersed in silicone oil.

In one embodiment, the peroxide may be selected from cyclic peroxide, diacyl peroxide, dialkyl peroxide, hydroperoxide, peroxycarbonate, peroxydicarbonate, peroxyester, ketone peroxide, derivatives of ketone peroxide, inorganic peroxide, peroxyketal, mixed peroxide and mixtures of any two or more of these peroxides. In one embodiment, the peroxide is selected from dialkyl peroxyketal, dialkyl peroxide, di(alkylperoxy)alkylene, di(alkylperoxy)aralkylene, alkyl acyl peroxide, alkyl hydroperoxide, or a mixture thereof, such as dicumyl peroxide, di(t-butyl)peroxide, di(t-butylperoxyisopropyl)benzene, t-butyl peroxy-3,5,5-trimethylhexanoate, 2,5-di-methyl-2,5-di(t-butylperoxy)hexane, cumyl hydroperoxide, 1,1-di(t-butylperoxy)-cyclohexane and 1,1-di(t-butylperoxy)-3,3,5-trimethylcyclohexane. In one embodiment, the peroxide is 1,1-di(t-butylperoxy)cyclohexane or 1,1-di(t-butylperoxy)-3,3,5-tri-methylcyclohexane. In one embodiment, the peroxide is 1,1-di(t-butylperoxy)cyclohexane.

In one embodiment, the treated aramid fiber comprises one or more of an aliphatic fatty acid, aliphatic fatty ester, wax, or other processing aid. In one embodiment the aliphatic fatty acid or synthetic microcrystalline wax is present in a mount ranging from 10 to 90 percent by weight, based on the weight of the fiber. In one embodiment, the treated aramid fiber comprises an aliphatic fatty ester and a wax. In one embodiment the aliphatic fatty ester is stearyl stearate. In one embodiment, the wax is polyethylene wax.

The rubber composition may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts*, 2003, 62nd edition, published by the Institute of Petroleum, United Kingdom.

The rubber composition may include up to 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. No. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

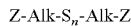

Z-Alk-S$_n$-Alk-Z   III in which Z is selected from the group consisting of

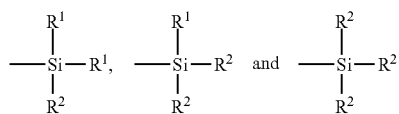

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula III, Z may be

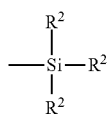

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, CH$_3$(CH$_2$)$_6$C(=O)—S—CH$_2$CH$_2$CH$_2$Si(OCH$_2$CH$_3$)$_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition is accomplished in at least three stages, namely, at least two non-productive stages followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). Between mix stages, the temperature of the rubber composition is cooled to a lower temperature. The terms "non-productive" and "productive" mix stages are well known to those having skill in the rubber mixing art. Of significance in the present invention, the treated aramid fiber is added during a second non-productive mix stage. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

Mixing of the rubber composition is typically done in suitable rubber mixing apparatus, such as a Banbury mixer or the like.

Following mixing, the rubber composition may be milled, calendared, extruded, or otherwise processed to form a rubber component of a pneumatic tire. The rubber composition may be incorporated in a variety of rubber components of the tire. For example, the rubber component may be a tread (including tread cap and tread base), sidewall, apex, chafer, sidewall insert, wirecoat or innerliner. Preferably, the compound is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

EXAMPLE 1

In this example, the effect of adding treated short aramid fibers comprising a peroxide in a second non-productive mix step is illustrated. Four rubber samples were compounded following the recipes in Table 1, with all amounts given in phr.

Samples 1 and 2 were mixed using a three-step mix procedure, with two non-productive mix stages and one productive mix stage. Sample 1 was a control with no addition of short aramid fibers. Sample 2 included addition of treated short aramid fibers in the second non-productive mix stage and was therefore representative of the current invention. For Sample 2, during the second non-productive rotor speed was kept constant at 40 rpm. The addition of the treated short aramid fibers led to an increase of temperature in this case, the compound dropped at 160° C. after 3 minutes. By contrast, the control Sample 1 never reached 160° C.

Samples 3 and 4 were comparative with treated short aramid fibers added in the first non-productive mix stage for Sample 4.

Samples were cured for 32 minutes at 150° C. All of the rubber compounds were tested for viscoelastic properties using a Metravib SMD 2000 at a test temperature of 90° C. and a frequency of 7.8 Hz. Results of the viscoelastic tests are shown in Table 2 as an average of two measurements for each sample, and in FIGS. 1, 2 and 3.

TABLE 1

| | Sample No. | | | |
|---|---|---|---|---|
| | 1 | 2 | 3 | 4 |
| Type | Control | Inventive | Control | Comp |
| First Non-Productive Mix Step | | | | |
| Styrene-Butadiene | 23 | 23 | 23 | 23 |
| Polybutadiene | 20 | 20 | 20 | 20 |
| Natural Rubber | 57 | 57 | 57 | 57 |
| Carbon Black | 31.2 | 31.2 | 52 | 52 |
| Wax | 1 | 1 | 1 | 1 |
| Antidegradants | 0 | 0 | 2 | 1 |
| Oil | 2 | 2 | 2 | 2 |
| Zinc Oxide | 2.5 | 2.5 | 4.5 | 4.5 |
| Stearic Acid | 2 | 2 | 2 | 2 |
| Silica | 0 | 0 | 3 | 3 |
| Short Fibers[1] | 0 | 0 | 0 | 1.5 |
| Second Non-Productive Mix Step | | | | |
| Carbon Black | 20.8 | 20.8 | — | — |
| Antidegradants | 2 | 2 | — | — |
| Zinc Oxide | 2 | 2 | — | — |
| Silica | 3 | 3 | — | — |
| Short Fibers | 0 | 1.5 | — | — |
| Productive Mix Step | | | | |
| Sulfur | 1.3 | 1.3 | 1.3 | 1.3 |
| Accelerators | 1.8 | 1.8 | 1.8 | 1.8 |

[1]Treated short aramid fibers, reportedly containing 40 percent by weight of Twaron aramid fibers, 30 percent by weight of stearyl stearate, 20 percent by weight of processing aid, and 10 percent by weight of peroxide, as Sulfron ® 3001 from Teijin Aramid.

TABLE 2

| | Sample No. | | | |
|---|---|---|---|---|
| | 1 | 2 | 3 | 4 |
| Elastic Modulus, G' (MPa) | | | | |
| 0.75% strain | 3.71 | 3.14 | 3.86 | 3.73 |
| 1% strain | 3.43 | 2.94 | 3.56 | 3.47 |
| 3% strain | 2.50 | 2.27 | 2.58 | 2.60 |
| 5% strain | 2.21 | 2.02 | 2.26 | 2.29 |
| 6% strain | 2.11 | 1.95 | 2.16 | 2.21 |
| 10% strain | 1.89 | 1.76 | 1.93 | 1.99 |
| 15% strain | 1.74 | 1.63 | 1.77 | 1.83 |
| 20% strain | 1.64 | 1.55 | 1.66 | 1.72 |
| Inelastic Modulus, G" (MPa) | | | | |
| 0.75% strain | 0.496 | 0.377 | 0.525 | 0.471 |
| 1% strain | 0.500 | 0.382 | 0.531 | 0.481 |

TABLE 2-continued

| | Sample No. | | | |
|---|---|---|---|---|
| | 1 | 2 | 3 | 4 |
| 3% strain | 0.433 | 0.349 | 0.454 | 0.423 |
| 5% strain | 0.369 | 0.307 | 0.388 | 0.363 |
| 6% strain | 0.344 | 0.291 | 0.362 | 0.342 |
| 10% strain | 0.281 | 0.244 | 0.296 | 0.282 |
| 15% strain | 0.237 | 0.207 | 0.247 | 0.237 |
| 20% strain | 0.208 | 0.186 | 0.216 | 0.208 |
| Tan Delta | | | | |
| 0.75% strain | 0.134 | 0.120 | 0.136 | 0.127 |
| 1% strain | 0.146 | 0.130 | 0.149 | 0.139 |
| 3% strain | 0.173 | 0.154 | 0.176 | 0.163 |
| 5% strain | 0.167 | 0.152 | 0.172 | 0.159 |
| 6% strain | 0.163 | 0.150 | 0.167 | 0.155 |
| 10% strain | 0.149 | 0.139 | 0.153 | 0.142 |
| 15% strain | 0.137 | 0.127 | 0.139 | 0.130 |
| 20% strain | 0.127 | 0.120 | 0.130 | 0.121 |

FIG. 1 shows the corresponding tan delta data. Samples 1 and 2 correspond to the compounds mixed with two non-productive stages, and Samples 3 and 4 correspond to the compounds mixed with one non-productive stage. Sample 4 mixed having treated short aramid fiber addition in the first non-productive step showed higher tan delta at all strains than for sample 2 mixed with treated short aramid fiber addition in the second non-productive mix step. Tan delta is generally reduced in presence of the treated short aramid fiber, but addition of the treated short aramid fibers in the second non-productive mix step surprisingly and unexpectedly results in a significant further reduction in tan delta. Significantly, a surprisingly superior result is obtained when the treated short aramid fiber is added in the second non-productive mix step, with a reduction in the maximum tan delta by about 11% for Sample 2 as compared with control Sample 1. By contrast, when the treated short aramid fiber is added in a first non-productive mix step, the reduction in maximum tan delta is only about 7% for Sample 4 as compared with control Sample 3.

Figure 2:
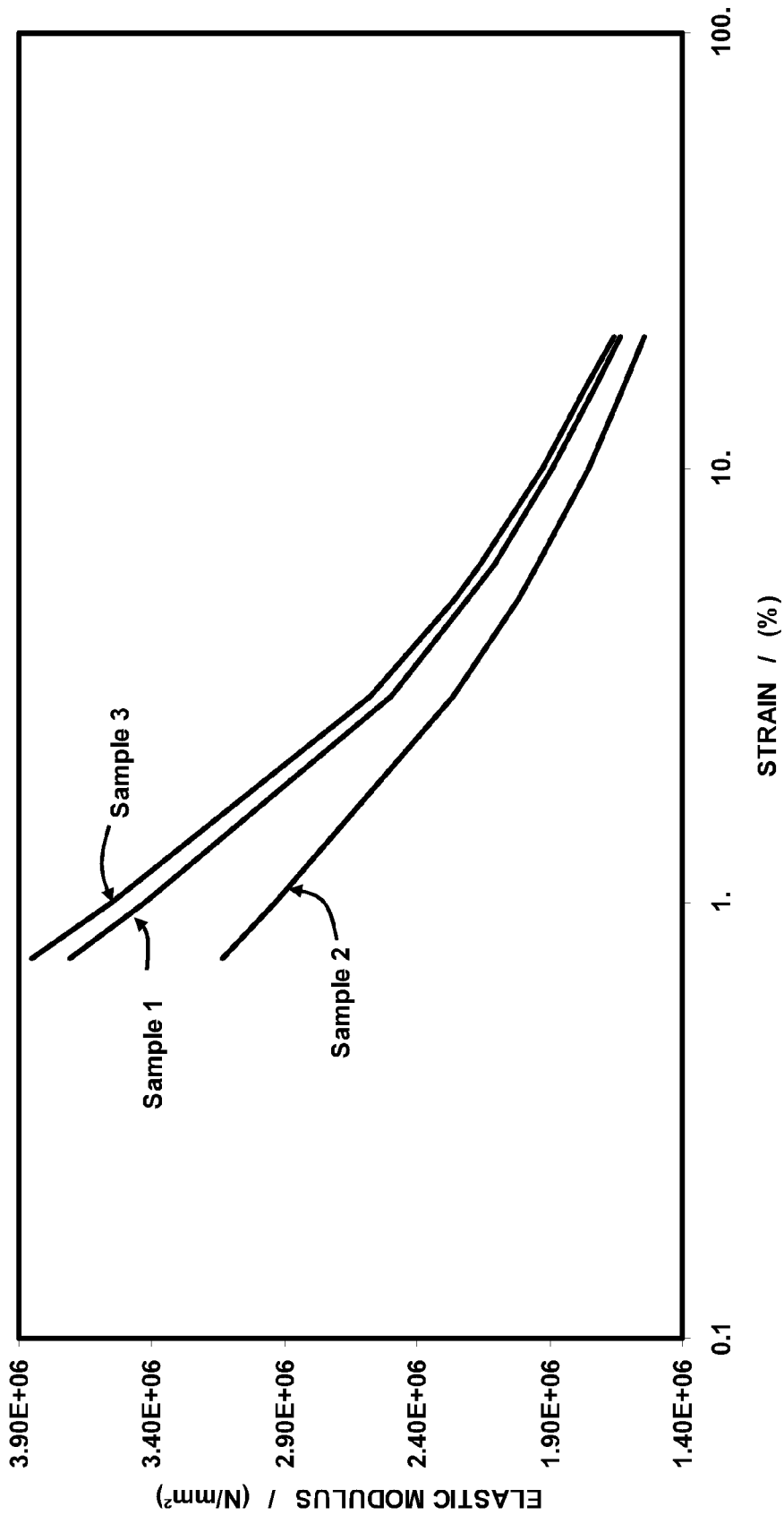
FIG. 2 is a plot of storage modulus versus strain for several rubber compositions.
Figure 3:
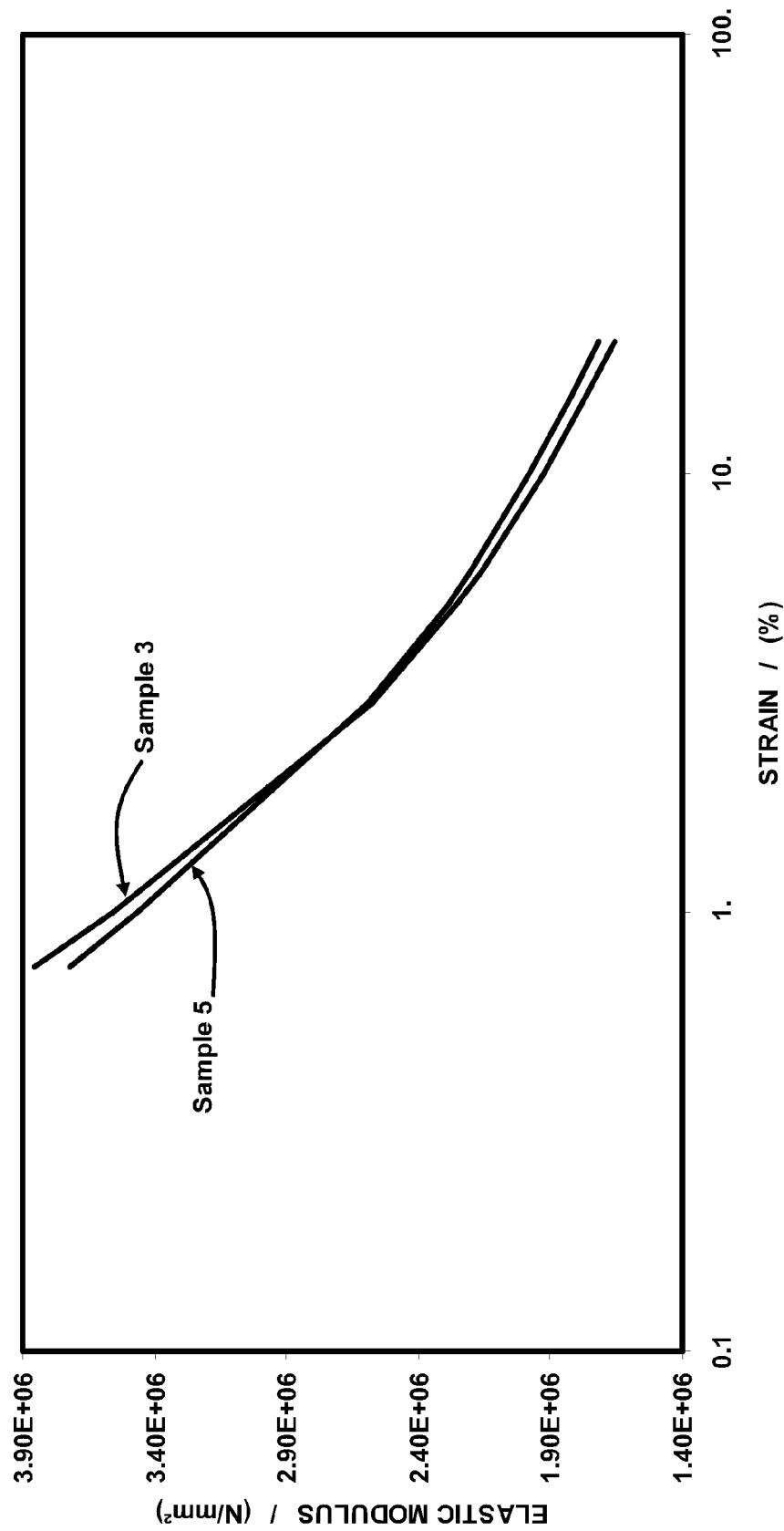
FIG. 3 is a plot of storage modulus versus strain for several rubber compositions.

FIGS. 2 and 3 show the effect of adding treated short aramid fibers on the elastic modulus of the rubber compounds, following 32 minutes cure at 150° C. FIG. 2 shows the data for the Samples 1 and 2 mixed with addition of treated short aramid fibers in the second non-productive mix step. Sample 3 is included in FIG. 2 for comparison. FIG. 3 shows the data obtained for the Samples 3 and 4 mixed with addition of treated short aramid fibers in the first-nonproductive mix step.

Comparison of FIGS. 2 and 3 shows that control Sample 3 containing no treated short aramid fiber has a moderately higher elastic modulus G' when mixed with a single non-productive mix step than for control Sample 1 mixed with two non-productive mix steps. In both FIGS. 2 and 3, G' decreases when treated short aramid fiber is added. However, the decrease of G' is much more significant when the treated short aramid fiber is mixed in the second non-productive mix step, as see in FIG. 2. The low strain value for Sample 2 is surprisingly and unexpectedly decreased by as much as 15% compared with control Sample 1. By contrast, the low strain value for Sample 4 is only slightly less than that for control Sample 3.

As illustrated in FIGS. 2 and 3, change in elastic modulus G' over the measured strain range is much lower for Sample 2 compared to control than for Sample 4 versus control. This can be explained by the Payne effect demonstrating improved interaction of the rubber with the treated short aramid fiber for inventive Sample 2. The Payne effect is the nonlinear dynamic mechanical property of elastomers in the presence of filler first studied by Payne, Appl. Polym. Sci., 6, 57 (1962). It is generally associated with the breakdown and agglomeration of filler particles. Filler-matrix interactions are also thought to be contributing factors to the Payne effect. Such processes are the slippage of entanglements between bound rubber and the mobile rubber phase, molecular surface slippage or rearrangement and release of trapped rubber within the filler network. The magnitude of strain dependence of dynamic moduli increases with decreasing molecular weight and strongly reduced by increasing polymer-filler interaction. See, e.g., G. Heinrich et al., *Advances in Polymer Science*, 160, 1436-5030 (2002); S. S. Sternstein et al., *Macromolecules*, 35, 7262-7273 (2002); Ai-Jun Zhu et al., *Composite Science and Technology*, 63, 1113-1126 (2003); J. D. Ulmer et al., Rubber Chem. & Techn., 71(4), 637-667 (1998); C. Gauthier et al., *Polymer*, 45, 2761-2771 (2003). Therefore measurement of Payne effect is highly suitable to quantify polymer-filler interactions. As seen in FIGS. 2 and 3 then, the significantly lower strain dependence of elastic modulus G' over the measured strain range for Sample 2 compared to control than for Sample 4 versus control surprisingly and unexpectedly indicates significant improvement in interaction between the treated short aramid fibers and rubber when the fiber is mixed in the second non-productive mix step as compared with a first non-productive mix step.

While certain representative embodiments and details have been shown for the purpose of illustrating the invention, it will be apparent to those skilled in this art that various changes and modifications may be made therein without departing from the spirit or scope of the invention.

What is claimed is:

1. A method of processing a rubber composition, comprising the steps of
    mixing at least one diene base elastomer with at least one additive selected from the group consisting of fillers, to a final temperature of about 150 to about 160° C. in a first non-productive mix step to form a first non-productive mix;
    cooling the first non-productive mix to a temperature of about 60 to about 90° C.;
    mixing the first non-productive mix with 0.1 to 10 parts by weight, per 100 parts by weight of elastomer, of a treated short aramid fiber having a length ranging from 1 to 10 mm and having a thickness ranging from 5 to 15 microns and comprising 3 to 40 percent by weight, based on the weight of the aramid, of a peroxide radical initiator in a second non-productive mix step to a final temperature of about 150 to about 160° C. to form a second non-productive mix; and
    mixing the second non-productive mix with curatives in a productive mix step to form a productive mix.

2. The method of claim 1, wherein short aramid fiber comprises from 6 to 30 percent by weight, based on the weight of the aramid, of a peroxide radical initiator.

3. The method of claim 1, wherein the peroxide radical initiator is selected from the group consisting of cyclic peroxide, diacyl peroxide, dialkyl peroxide, hydroperoxide, peroxycarbonate, peroxydicarbonate, peroxyester, ketone peroxide, derivatives of ketone peroxide, inorganic peroxide, peroxyketal, mixed peroxide and mixtures of any two or more of these peroxides.

4. The method of claim 1, wherein the peroxide radical initiator is selected from the group consisting of 1,1-di(t-butylperoxy)cyclohexane and 1,1-di(t-butylperoxy)-3,3,5-tri-methylcyclohexane.

5. The method of claim 1, wherein the peroxide radical initiator is 1,1-di(t-butylperoxy)cyclohexane.

6. The method of claim 1, wherein the treated short aramid fiber further comprises at least one member of the group consisting of an aliphatic fatty acids, aliphatic fatty esters, and waxes.

7. The method of claim 1, wherein the treated short aramid fiber further comprises stearyl stearate.

8. The method of claim 1, wherein the treated short aramid fiber further comprises polyethylene wax.

9. A rubber composition made by the method of claim 1.

10. A pneumatic tire comprising a rubber composition made by the method of claim 1.

11. The method of claim 1, wherein the peroxide radical initiator is selected from dialkyl peroxyketal, dialkyl peroxide, di(alkylperoxy)alkylene, di(alkylperoxy)aralkylene, alkyl acyl peroxide, alkyl hydro-peroxide, or a mixture thereof, such as dicumyl peroxide, di(t-butyl)peroxide, di(t-butylperoxyisopropyl)benzene, t-butyl peroxy-3,5,5-trimethylhexanoate, 2,5-di-methyl-2,5-di(t-butylperoxy)hexane, cumyl hydroperoxide, 1,1-di(t-butylperoxy)-cyclohexane and 1,1-di(t-butylperoxy)-3,3,5-trimethylcyclohexane.

* * * * *